United States Patent
Fagiano et al.

(10) Patent No.: US 10,684,993 B2
(45) Date of Patent: Jun. 16, 2020

(54) SELECTIVE COMPRESSION OF UNSTRUCTURED DATA

(71) Applicants: International Business Machines Corporation, Armonk, NY (US); Computer Task Group, Inc., Buffalo, NY (US)

(72) Inventors: Christophe Fagiano, Mouans-Sartoux (FR); Itzhack Goldberg, Hadera (IL); Neil Sondhi, Pilisborosjeno (HU); Daniel J. Winarski, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 732 days.

(21) Appl. No.: 15/182,799

(22) Filed: Jun. 15, 2016

(65) Prior Publication Data
US 2017/0364529 A1    Dec. 21, 2017

(51) Int. Cl.
*G06F 16/174* (2019.01)
*H04L 29/08* (2006.01)

(52) U.S. Cl.
CPC ...... *G06F 16/1744* (2019.01); *H04L 67/1097* (2013.01)

(58) Field of Classification Search
None
See application file for complete search history.

(56) References Cited

U.S. PATENT DOCUMENTS

| | | | |
|---|---|---|---|
| 6,128,406 A * | 10/2000 | Ostrovsky | G06T 9/005 382/166 |
| 7,966,363 B2 | 6/2011 | Boehm et al. | |
| 8,832,045 B2 | 9/2014 | Dodd et al. | |
| 9,025,892 B1 | 5/2015 | Lightner et al. | |
| 9,110,965 B1 * | 8/2015 | Shah | G06F 17/30575 |
| 9,219,905 B1 * | 12/2015 | Georges, III | G03H 1/08 |

(Continued)

FOREIGN PATENT DOCUMENTS

EP    2189905 A1    5/2010

OTHER PUBLICATIONS

Pappas, Vasilis, et al., "CloudFence: Data Flow Tracking as a Cloud Service," in Research in Attacks, Intrusions, and Defenses, pp. 411-431, Oct. 2013.

(Continued)

*Primary Examiner* — Thu N Nguyen
(74) *Attorney, Agent, or Firm* — Nelson and Nelson; Daniel P. Nelson; Alexis V. Nelson

(57) ABSTRACT

A method for selectively compressing unstructured data includes preparing, at a host system, a data blob made up of unstructured data, for storage on a storage system. The method encodes a first portion of the data blob with a first color and a second portion of the data blob with a second color. The first color indicates that the associated portion should remain uncompressed, while the second color indicates that the associated portion should be compressed. The method transmits the encoded data blob to a storage virtualization layer associated with the storage system. In response, the storage virtualization layer stores the first portion in an uncompressed format, and compresses the second portion and stores the second portion in a compressed format. A corresponding system and computer program product are also disclosed herein.

20 Claims, 7 Drawing Sheets

(56) References Cited

U.S. PATENT DOCUMENTS

| | | |
|---|---|---|
| 2004/0061701 A1 | 4/2004 | Arquie et al. |
| 2004/0215764 A1 | 10/2004 | Allen et al. |
| 2005/0015662 A1 | 1/2005 | Scanlan |
| 2006/0122956 A1* | 6/2006 | Shimogori ........ G06F 17/30011 |
| 2006/0170703 A1* | 8/2006 | Liao .......................... G06T 9/00 345/613 |
| 2007/0061385 A1 | 3/2007 | Clark et al. |
| 2008/0034268 A1 | 2/2008 | Dodd et al. |
| 2009/0129691 A1* | 5/2009 | Luttmer ................ H04N 1/417 382/244 |
| 2011/0202509 A1* | 8/2011 | He ......................... H03M 7/30 707/693 |
| 2011/0243469 A1* | 10/2011 | McAllister ............... G06T 9/00 382/239 |
| 2011/0276921 A1 | 11/2011 | Long |
| 2012/0185438 A1 | 7/2012 | Giampaolo et al. |
| 2012/0253891 A1 | 10/2012 | Hayes et al. |
| 2014/0189680 A1 | 7/2014 | Kripalani |
| 2015/0058294 A1 | 2/2015 | Akirav et al. |
| 2015/0058297 A1 | 2/2015 | Akirav et al. |
| 2016/0378352 A1* | 12/2016 | Khan ................... G06F 3/0608 711/103 |

OTHER PUBLICATIONS

List of IBM Patents or Patent Applications Treated as Related.
Agarwal, V. et al.; "Method and System for Extracting Temporal Information Corresponding to Artifacts in a Website"; http://ip.com/IPCOM/000200485D; Oct. 15, 2010.
Oracle; "Unstructured Data Management with Oracle Database 12C"; Oracle Corporation; Oracle Database 12c/Oracle White Paper; Sep. 2014.

* cited by examiner

SELECTIVE COMPRESSION OF UNSTRUCTURED DATA

BACKGROUND

Field of the Invention

This invention relates to systems and methods for selectively compressing unstructured data.

Background of the Invention

Digital information can generally be classified as either structured or unstructured. Structured information generally refers to data maintained within a relational database. Unstructured information generally encompasses everything else, such as documents, images, movies, and the like. Both structured and unstructured data can be actively referenced by users or applications, or kept unmodified for future reference or compliance. Of structured and unstructured information, active information is routinely referenced or modified, whereas inactive information is only occasionally referenced or may only have the potential of being referenced at some future point in time.

Most data (about eighty percent according to some studies) is inactive or "cold," meaning that the data is infrequently accessed (i.e., infrequently read from and/or written to). "Hot" data, by contrast, is regularly accessed. Storing "cold" data in its original uncompressed form consumes expensive storage space. For this reason, "cold" data, once identified, may be compressed and migrated to cheaper and slower storage media. However, all data by definition is initially active and "hot" when it is first written, at least from a storage perspective, regardless of when the data will be accessed again. In the business world, it is very difficult to anticipate future access patterns of incoming data and classify it accordingly.

Because data that is written to a storage system is initially considered active and "hot," regardless of how it will be accessed in the future, this data may unnecessarily utilize expensive storage space before it becomes "cold" and is migrated to slower and less expensive storage media. This can amount to a significant amount of time depending on the migration policy. When unstructured data is identified as "cold" and subsequently compressed and stored on slower and less expensive storage media, the data becomes more difficult to access. That is, additional time is needed to decompress and access the data on the slower storage media.

In view of the foregoing, what are needed are systems and methods to more efficiently store and access unstructured data. Such systems and methods may, in some cases, immediately classify unstructured data as "cold" at or near the time it is written. This will enable the data to be immediately stored or migrated to slower and less expensive storage media. Further needed are systems and methods to improve the accessibility of unstructured data after it is compressed and stored.

SUMMARY

The invention has been developed in response to the present state of the art and, in particular, in response to the problems and needs in the art that have not yet been fully solved by currently available systems and methods. Accordingly, the invention has been developed to provide systems and methods to selectively compress unstructured data. The features and advantages of the invention will become more fully apparent from the following description and appended claims, or may be learned by practice of the invention as set forth hereinafter.

Consistent with the foregoing, a method for selectively compressing unstructured data is disclosed. In one embodiment, such a method includes preparing, at a host system, a data blob made up of unstructured data, for storage on a storage system. The method encodes a first portion of the data blob with a first color and a second portion of the data blob with a second color that is distinct from the first color. The first color indicates that the associated portion should remain uncompressed, while the second color indicates that the associated portion should be compressed. The method transmits the encoded data blob to the storage system, where the storage system is able to detect the first color of the first portion and the second color of the second portion. In response, the storage system stores the first portion in an uncompressed format, and compresses the second portion and stores the second portion in a compressed format.

A corresponding system and computer program product are also disclosed and claimed herein.

BRIEF DESCRIPTION OF THE DRAWINGS

In order that the advantages of the invention will be readily understood, a more particular description of the invention briefly described above will be rendered by reference to specific embodiments illustrated in the appended drawings. Understanding that these drawings depict only typical embodiments of the invention and are not therefore to be considered limiting of its scope, the invention will be described and explained with additional specificity and detail through use of the accompanying drawings, in which.

DETAILED DESCRIPTION

Figure 1:
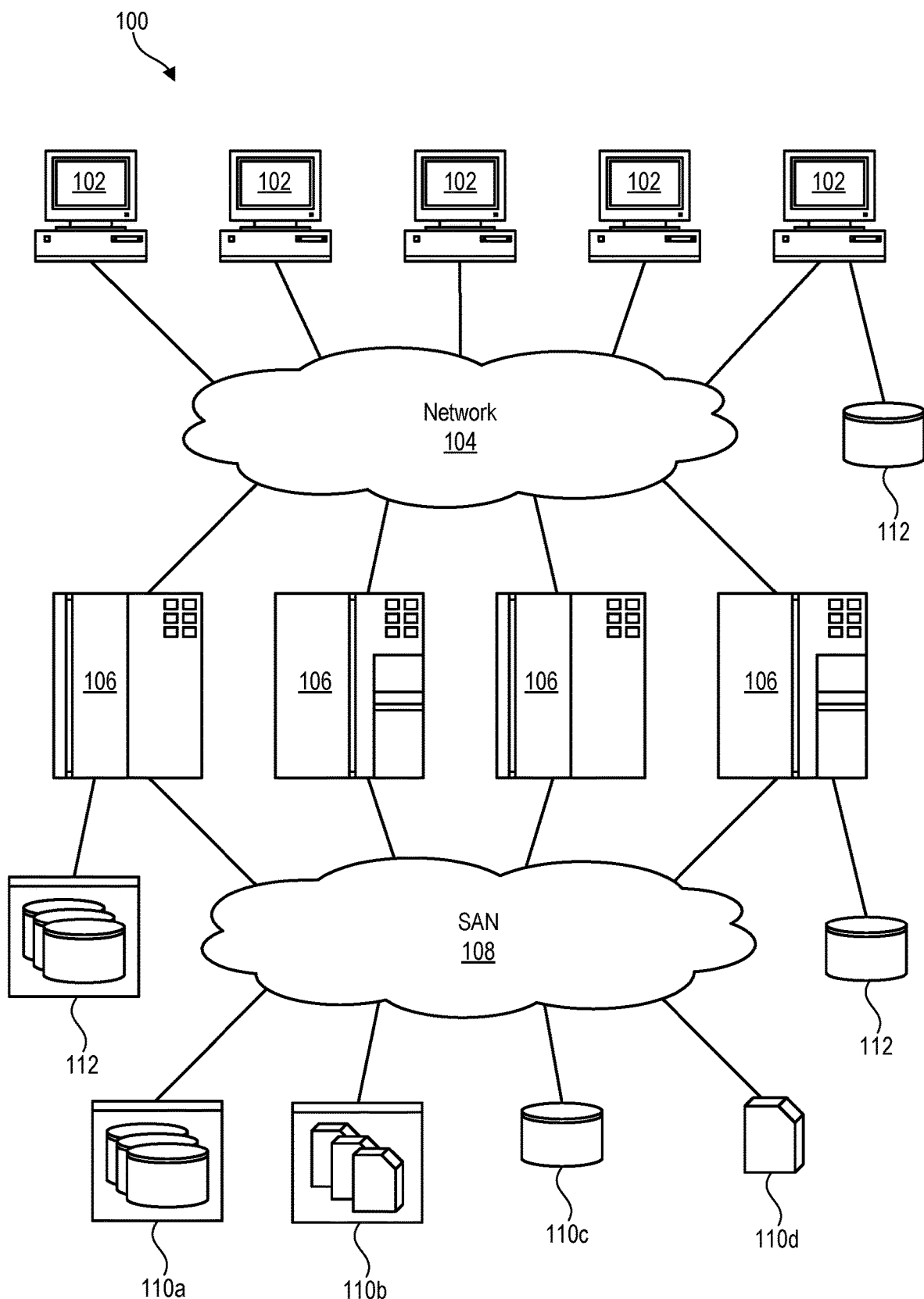
FIG. 1 is a high-level block diagram showing one example of an environment in which a tiered storage system may be implemented.

It will be readily understood that the components of the present invention, as generally described and illustrated in the Figures herein, could be arranged and designed in a wide variety of different configurations. Thus, the following more detailed description of the embodiments of the invention, as represented in the Figures, is not intended to limit the scope of the invention, as claimed, but is merely representative of certain examples of presently contemplated embodiments in accordance with the invention. The presently described embodiments will be best understood by reference to the drawings, wherein like parts are designated by like numerals throughout.

The present invention may be embodied as a system, method, and/or computer program product. The computer program product may include a computer readable storage medium (or media) having computer readable program instructions thereon for causing a processor to carry out aspects of the present invention.

The computer readable storage medium may be a tangible device that can retain and store instructions for use by an instruction execution device. The computer readable storage medium may be, for example, but is not limited to, an electronic storage system, a magnetic storage system, an optical storage system, an electromagnetic storage system, a semiconductor storage system, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage system via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages.

The computer readable program instructions may execute entirely on a user's computer, partly on a user's computer, as a stand-alone software package, partly on a user's computer and partly on a remote computer, or entirely on a remote computer or server. In the latter scenario, a remote computer may be connected to a user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, may be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

Referring to FIG. 1, one example of a network environment 100 is illustrated. The network environment 100 is presented to show one example of an environment where embodiments of the invention may operate. The network environment 100 is presented only by way of example and not limitation. Indeed, the apparatus and methods disclosed herein may be applicable to a wide variety of different network environments in addition to the network environment 100 shown.

As shown, the network environment 100 includes one or more computers 102, 106 interconnected by a network 104. The network 104 may include, for example, a local-area-network (LAN) 104, a wide-area-network (WAN) 104, the Internet 104, an intranet 104, or the like. In certain embodiments, the computers 102, 106 may include both client computers 102 and server computers 106 (also referred to herein as "hosts" 106 or "host systems" 106). In general, the client computers 102 initiate communication sessions, whereas the server computers 106 wait for and respond to requests from the client computers 102. In certain embodiments, the computers 102 and/or servers 106 may connect to one or more internal or external direct-attached storage systems 112 (e.g., arrays of hard-storage drives, solid-state drives, tape drives, etc.). These computers 102, 106 and direct-attached storage systems 112 may communicate using protocols such as ATA, SATA, SCSI, SAS, Fibre Channel, or the like.

The network environment 100 may, in certain embodiments, include a storage network 108 behind the servers 106, such as a storage-area-network (SAN) 108 or a LAN 108 (e.g., when using network-attached storage). This network 108 may connect the servers 106 to one or more storage systems 110, such as arrays 110a of hard-disk drives or solid-state drives, tape libraries 110b, individual hard-disk drives 110c or solid-state drives 110c, tape drives 110d, CD-ROM libraries, or the like. To access a storage system 110, a host system 106 may communicate over physical connections from one or more ports on the host 106 to one or more ports on the storage system 110. A connection may be through a switch, fabric, direct connection, or the like. In certain embodiments, the servers 106 and storage systems 110 may communicate using a networking standard such as Fibre Channel (FC) or iSCSI.

In certain embodiments, the storage systems 110 illustrated in FIG. 1 may be organized into a tiered storage configuration. That is, some storage systems 110 (such as faster, higher-performance storage systems) may be used as primary storage, while other storage systems 110 (such as slower, lower-performance storage systems 110) may be used as secondary storage. For example, a disk array 100a comprising solid state drives and/or hard disk drives may be used as primary storage, while a tape library 110b may be used as secondary storage. Data that is hotter, newer, and/or more important may be stored on primary storage, while data that is colder, older, and/or less important may be moved to secondary storage.

Figure 2:
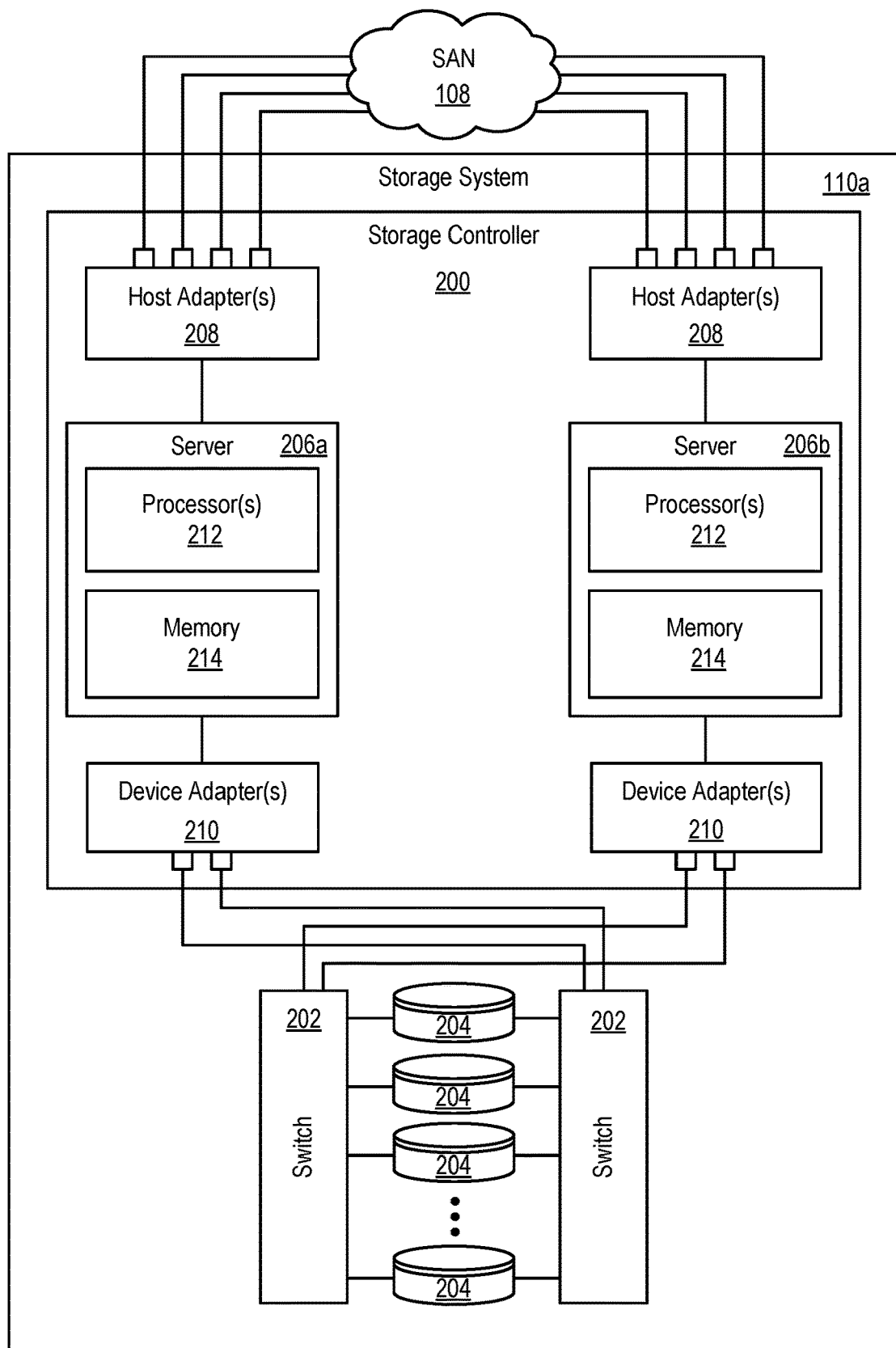
FIG. 2 is a high-level block diagram showing one embodiment of a storage system in which a tiered storage system may be all or partially implemented.

Referring to FIG. 2, one example of a storage system 110a containing an array of hard-disk drives 204 and/or solid-state drives 204 is illustrated. The internal components of the storage system 110a are shown since a tiered storage system may, in certain embodiments, be implemented within such a storage system 110a. For example, higher performance storage drives 204 may be used as primary storage, while lower performance storage drives 204, either on the same or a different storage system 110a, may be used as secondary storage. As shown, the storage system 110a includes a storage controller 200, one or more switches 202, and one or more storage drives 204, such as hard-disk drives 204 and/or solid-state drives 204 (e.g., flash-memory-based drives 204). The storage controller 200 may enable one or more hosts 106 (e.g., open system and/or mainframe servers 106) to access data in the one or more storage drives 204.

In selected embodiments, the storage controller 200 includes one or more servers 206. The storage controller 200 may also include host adapters 208 and device adapters 210 to connect the storage controller 200 to host devices 106 and storage drives 204, respectively. Multiple servers 206a, 206b may provide redundancy to ensure that data is always available to connected hosts 106. Thus, when one server 206a fails, the other server 206b may pick up the I/O load of the failed server 206a to ensure that I/O is able to continue between the hosts 106 and the storage drives 204. This process may be referred to as a "failover."

In selected embodiments, each server 206 may include one or more processors 212 and memory 214. The memory 214 may include volatile memory (e.g., RAM) as well as non-volatile memory (e.g., ROM, EPROM, EEPROM, hard disks, flash memory, etc.). The volatile and non-volatile memory may, in certain embodiments, store software modules that run on the processor(s) 212 and are used to access data in the storage drives 204. The servers 206 may host at least one instance of these software modules. These software modules may manage all read and write requests to logical volumes in the storage drives 204.

One example of a storage system 110a having an architecture similar to that illustrated in FIG. 2 is the IBM DS8000™ enterprise storage system. The DS8000™ is a high-performance, high-capacity storage controller providing disk and solid-state storage that is designed to support continuous operations. Nevertheless, the methods disclosed herein are not limited to the IBM DS8000™ enterprise storage system 110a, but may be implemented in any comparable or analogous storage system 110, regardless of the manufacturer, product name, or components or component names associated with the system 110. Any storage system that could benefit from one or more embodiments of the invention is deemed to fall within the scope of the invention. Thus, the IBM DS8000™ is presented only by way of example and not limitation.

Figure 3:
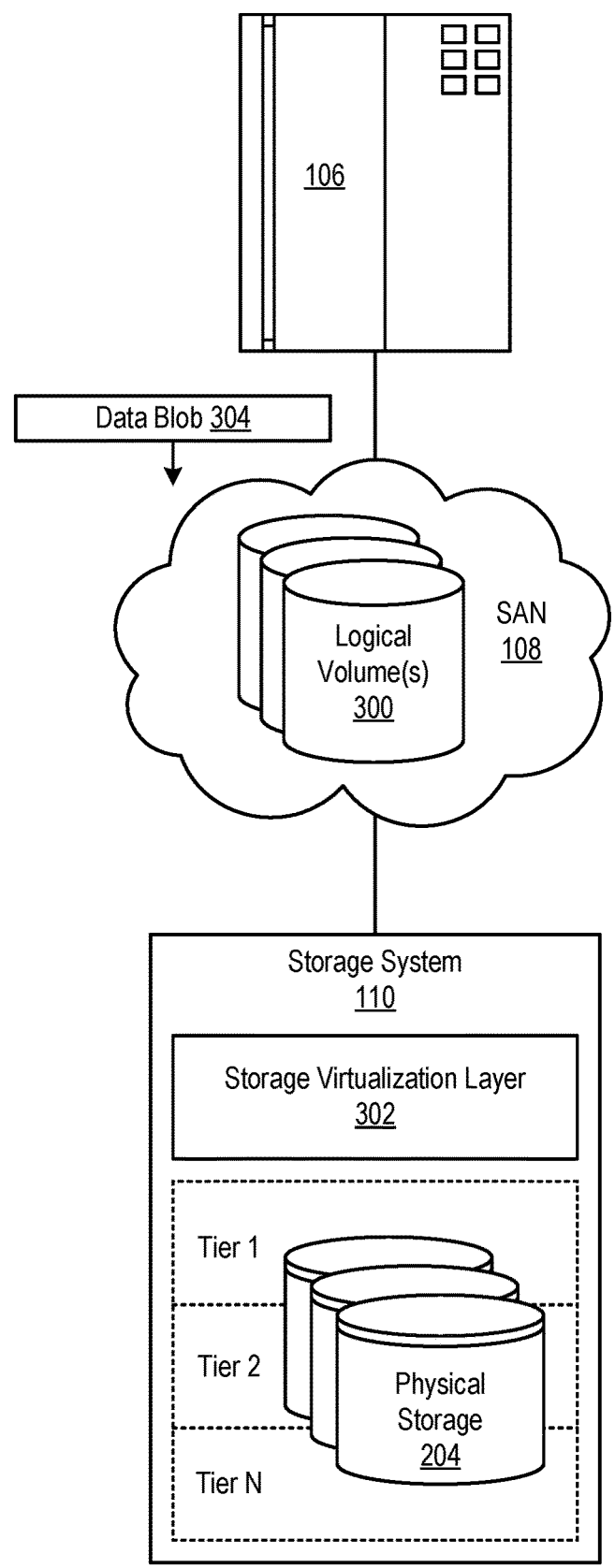
FIG. 3 is a high-level block diagram showing one embodiment of a tiered storage system for storing unstructured data.

Referring to FIG. 3, in certain embodiments, a storage virtualization layer 302 may be provided that virtualizes underlying physical storage resources 204, such as hard disk drives, solid state drives, tape drives, and the like. The storage virtualization layer 302 may reduce complexity of the underlying physical storage resources 204 from the perspective of the host system 106 by presenting the physical storage resources 204 as one or more logical volumes 300. The storage virtualization layer 302 may logically reside between the host system 106 and the storage system 110.

In certain embodiments, the storage virtualization layer 302 may be configured to provide block-level storage virtualization. This provides a flexible, logical arrangement of storage capacity to applications on the host system 106 while abstracting its physical location on the underlying physical storage resources 204. The storage virtualization layer 302 may intercept I/O requests to the logical volumes 300 and map these I/O requests to the appropriate physical locations. In this way, the storage virtualization layer 302 may enable administrators to provide storage capacity when and where its needed while isolating users and applications from the underlying complexity.

In addition to providing block-level storage virtualization, the storage virtualization layer 302 may be configured to set up and manage multiple storage tiers, and migrate data between these storage tiers in a way that is transparent to accessing users and applications. Data that is hotter, newer, and/or more important may be stored on or migrated to higher storage tiers containing faster and more expensive storage media, while data that is colder, older, and/or less important may be stored on or moved to lower storage tiers containing slower and less expensive storage media.

Figure 4:
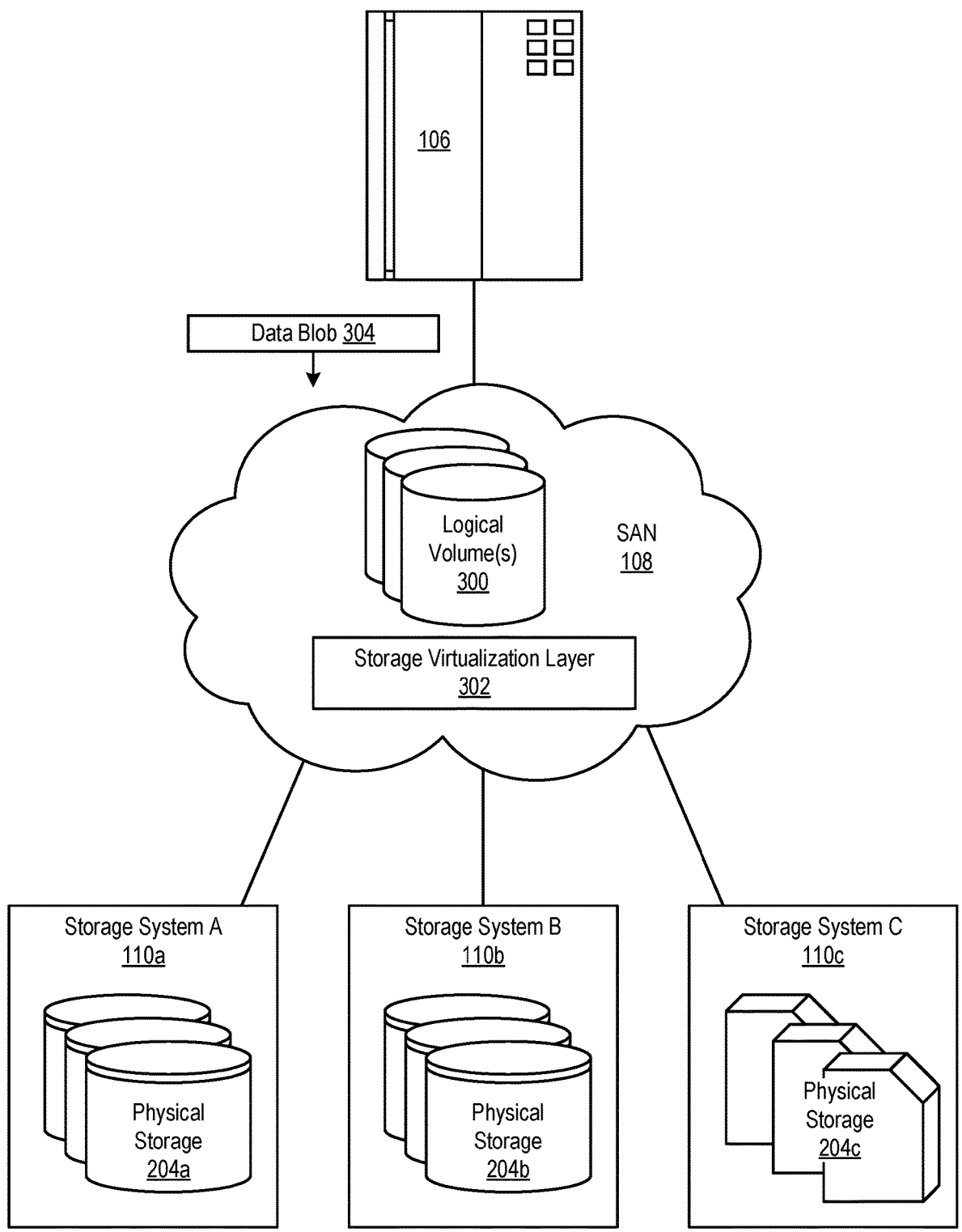
FIG. 4 is a high-level block diagram showing another embodiment of a tiered storage system for storing unstructured data.

In the embodiment illustrated in FIG. 3, the storage virtualization layer 302 is implemented in a storage system 110, although the storage virtualization layer 302 is not limited to such an implementation. The storage virtualization layer 302 may, in other embodiments, be implemented as a stand-alone appliance, or distributed across multiple machines or systems. FIG. 4 shows one embodiment of a storage virtualization layer 302 that is implemented as a stand-alone appliance. In this embodiment, the storage virtualization layer 302 may virtualize storage resources 204a-c (e.g., disk drives, solid state drives, tape, etc.) residing on multiple storage systems 110a-c. These storage resources 204a-c may be presented to a host system 106 as logical volumes 300 and may be logically divided into multiple storage tiers.

Referring again generally to FIGS. 3 and 4, when the storage virtualization layer 302 provides block-level storage to a host system 106, the storage virtualization layer 302 may have little if any knowledge of the data that is being stored thereon. For example, the storage virtualization layer 302 may be unaware how blocks received from a host system 106 relate to one another (i.e., whether they are part of the same file, for example). The storage virtualization layer 302 simply receives blocks and associated logical addresses from the host system 106 and stores the blocks at the indicated addresses. This provides little guidance to the storage virtualization layer 302 as to how these blocks may be stored most efficiently, such as whether certain blocks may or may not be compressed to save storage space.

In the event a host system 106 attempts to store a data blob 304 (e.g., a binary large object), made up of unstructured data, in the logical volumes 300, the storage virtualization layer 302 may have no understanding or concept of the type of data in the data blob 304 (i.e., whether the unstructured data is text, images, video, etc.). As a result, the storage virtualization layer 302 may be unable to take actions to more efficiently store the data (e.g., compress the data, deduplicate the data, or otherwise reduce the size or amount of data). Furthermore, the storage virtualization layer 302 may be unaware whether the data is "hot" or "cold" and may assume that the data is "hot" and store the data blob 304 on a primary storage tier containing more expensive storage media.

Figure 5:
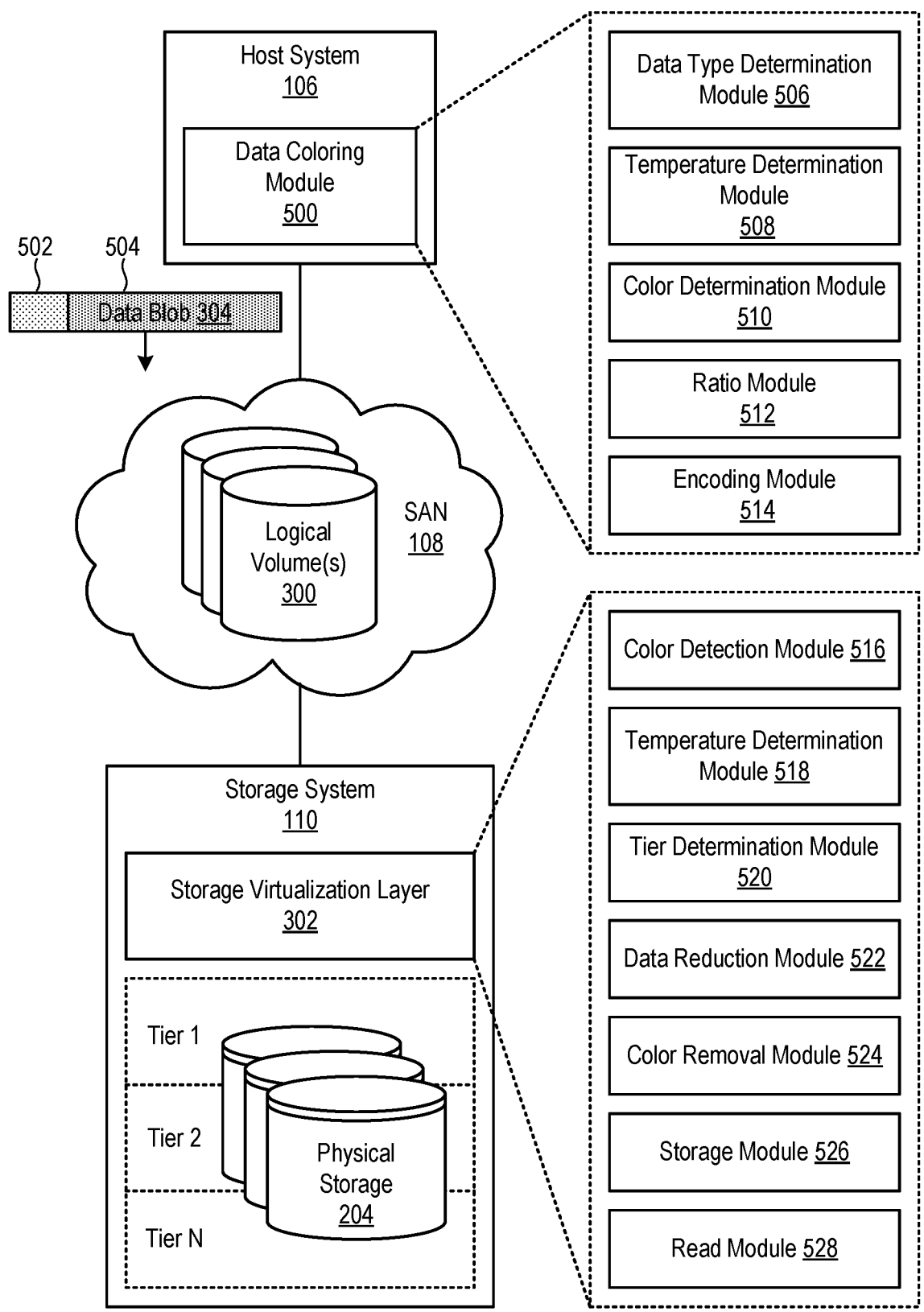
FIG. 5 is a high-level block diagram showing an improved technique for storing unstructured data in a tiered storage system.

Referring to FIG. 5, in view of the issues discussed above, it would be advantageous to provide a storage system 110 and/or storage virtualization layer 302 with helpful information about the data it is storing. This may enable the storage system 110 or storage virtualization layer 302 to store the data more efficiently, such as by compressing and/or deduplicating the data where appropriate. To provide such information, a host system 106 may in certain embodiments be configured with a data coloring module 500 that "colors" the data that it sends to a storage system 110 or storage virtualization layer 302. These colors may provide helpful information about the data that is being stored so that the data can be stored more intelligently.

For example, data compression is a well known technique for reducing the size of data, thereby allowing it to consume less storage space. Certain types of unstructured data are more compressible than others. For example, text data is highly compressible while image and video data is not so much. Because a storage system 110 or storage virtualization layer 302 may be unaware of the type of data it is storing, it may be unable to efficiently compress data when and where it is most useful. "Coloring" the data blob 304 when the data blob 304 contains primarily text may enable the storage system 110 and/or storage virtualization layer 302 to recognize the data blob 304 as text and compress and store it accordingly.

Other benefits may accrue from "coloring" the data as described above. For example, if a host system 106 knows that data being sent to a storage system 110 or storage virtualization layer 302 will not be accessed frequently or in the near future, the data can be "colored" in a manner to indicate that the data is "cold" from the outset. This may allow the data to be immediately archived on slower and less expensive storage media, thereby eliminating or reducing the time period that the data is stored on faster and more expensive storage media. In other words, the data may be archived immediately without having to wait to become "cold" in the conventional manner.

When coloring a data blob 304, the data blob 304 may be colored in a manner that minimizes the impact on users or applications attempting to access it. For example, compressed data is generally more difficult and time-consuming to access since it needs to be decompressed prior to access. To benefit from the space-saving benefits of data compression while minimizing the impacts on accessing users or applications, a first portion 502 of the data blob 304 may be left uncompressed while a second portion 504 of the data blob 304 may be compressed. This technique is effective due to the manner in which unstructured data is accessed. Unlike structured data, unstructured data typically requires a data blob 304 to be scanned or traversed from its beginning in order to locate a desired piece of information. This characteristic of unstructured allows most of a data blob 304 to be compressed, while leaving a smaller portion of the data blob 304 at its beginning uncompressed. When the data blob 304 is read, the first portion 502 of the data blob 304 may be read without any performance impact while the second portion 504 is being decompressed in parallel. Ideally, this will allow the second portion 504 to already be decompressed when it is reached by the scanning/traversal process. The ratio or size of the first portion 502 relative to the second portion 504 may be adjusted as needed to minimize I/O latency while maximizing the amount of the data blob 304 that is compressed.

As shown in FIG. 5, the data coloring module 500 may include various sub-modules to "color" a data blob 304 and provide other related features and functions. These sub-modules may include one or more of a data type determination module 506, temperature determination module 508, color determination module 510, ratio module 512, and encoding module 514. Similarly, the storage virtualization layer 302 may be programmed to include additional sub-modules to receive and interpret the colored data blob 304 and provide other related features and functions. These sub-modules may include one or more of a color detection module 516, temperature determination module 518, tier determination module 520, data reduction module 522, color removal module 524, storage module 526, and read module 528.

When a data blob 304 is prepared by a host system 106, the data type determination module 506 may determine the type of data that is contained within the data blob 304. Specifically, the data type determination module 506 may determine if the data blob 304 contains primarily text and/or other types of data that are readily and effectively compressed (also referred to herein as "compressible data"). If the data blob 304 contains primarily compressible data, the temperature determination module 508 optionally determines a current or anticipated temperature of the data. For example, if it is known beforehand that the data blob 304 will contain data that will be accessed infrequently, the temperature determination module 508 may classify the data blob 304 as "cold." Otherwise, the data blob 304 may be classified by default as "hot."

Once the type of data and/or temperature of the data is determined, a color determination module 510 may determine what color to use with the data blob 304. In certain embodiments, the first portion 502 of the data blob 304 is colored a first color and the second portion 504 is colored a second color that is different from the first color. In other embodiments, the first portion 502 is left uncolored (which for purposes of this disclosure may be considered a "neutral" color) and the second portion 504 is colored a second color (i.e., a "non-neutral" color), or vice versa. The color(s) may be selected to convey information about the data blob 304. For example, the color(s) may indicate which parts of the data blob 304 should be compressed or remain uncompressed, and also optionally indicate the anticipated hotness/coldness of the data in the data blob 304.

In other embodiments, the color(s) may be selected based on a type or level of compression that is preferably used. For example, if data is anticipated to be very "cold" and is unlikely to be accessed again, a more rigorous or processor-intensive compression technique may be used by the storage virtualization layer 302 to significantly reduce the size of the data. The color(s) selected may indicate what level of compression or data reduction the storage virtualization layer 302 should use. Other color(s) may be used to indicate less rigorous or processor-intensive compression or data reduction techniques, which may be less effective at reducing data volume but may be easier to reverse. For example, if data is less "cold" and therefore more likely to be accessed again, the data will need to be decompressed before it is accessed. In such cases, a less rigorous or processor-intensive level of compression may be preferred since less processing power may be required to decompress the data. Thus, the color(s) discussed herein may indicate not only whether data is to be compressed, but also the level of compression that should be used. The color(s) selected may indicate the actual compression technique to be used by the storage virtualization layer 302 or simply indicate a desired level of compression and let the storage virtualization layer 302 choose the actual technique that is used.

The ratio module 512 may determine the ratio or size of the first portion 502 relative to the second portion 504. Alternatively, the ratio module 512 may indicate the size of the first portion 502 and the second portion 504 may make up any remaining portion of the data blob 304. In certain embodiments, the ratio module 512 may adjust the ratio of the first portion 502 to the second portion 504 with the goal of minimizing I/O latency while maximizing the amount of the data blob 304 that can be compressed. For example, if the second portion 504 is not able to be decompressed as fast as is needed for reading/retrieval, the ratio module 512 may expand the size of the uncompressed portion 502 (i.e., the first portion 502) relative to the compressed portion 504 (i.e., the second portion 504). This adjustment may be made by a user, at selected intervals, or automatically on the fly in response to detected conditions.

Once the color of the data is determined and the ratio or size of the first portion 502 relative to the second portion 504 is known, the encoding module 514 may encode the data blob 304 with the determined color(s). In certain embodiments, the encoding module 514 accomplishes this by building on otherwise "invalid" Unicode patterns. Specifically, the encoding module 514 may replace the stock SPACE character (or another selected character) in the text with a custom or special character that can be interpreted by the storage virtualization layer 302 as a "color" in addition to the original character. The SPACE character is common to all languages and is spread substantially evenly through text documents. By "coloring" the SPACE characters, the text can be colored at the granularity of the word/sentence, as opposed to just at the header level. Specifically, the text stream itself can be "colored" with embedded codes as opposed to indicating its color with leading or trailing characters such as a header/trailer. Because a text document may be processed in chunks (i.e., blocks), this allows the storage virtualization layer 302 to the know the color of the individual chunks even if they are processed separately from a chunk comprising a header/trailer, are processed by different threads, or if their relationship to the header/trailer is lost or unknown.

Nevertheless, embodiments of the invention are not limited to replacing every character of a certain type with a special character representing a color. In other embodiments, every $n^{th}$ character of a certain type is replaced, or characters at or near a beginning and/or end of the first portion 502 and second portion 504 are "colored" to indicate where the first portion 502 and/or second portion 504 begins and/or ends. The intent of the "coloring" is, at least partly, to advise the storage system 110 or storage virtualization layer 302 what parts of the data blob 304 should be compressed and what parts should remain uncompressed.

When a data blob 304 is received by the storage virtualization layer 302, the color detection module 516 may detect the color of the incoming data blob 304, including the first color of the first portion 502 and the second color of the second portion 504. In certain embodiments, the first and second colors may indicate the dividing line between the first and second portions 502, 504. The temperature determination module 518 may optionally determine, from the color(s), the hotness/coldness of the data in the data blob 304 so that the data blob 304 can be stored accordingly. For example, the temperature determination module 518 may identify the data blob 304 as "hot" or "cold" from the color(s) so that it can be stored on an appropriate storage tier. Based on the color(s), the tier determination module 520 may identify the appropriate storage tier to store the data blob 304. For example, if the color(s) indicate that the data blob 304 is "cold," lower storage tiers used for archiving data may be selected as the appropriate location to store the data. This may alter the normal process of waiting for the data to become "cold" while residing on higher and more expensive storage tiers.

Once an appropriate storage tier is selected to store the data, the data reduction module 522 may compress the second portion 504 and the storage module 526 may store the data blob 304 on the selected storage tier. Because, the data reduction module 522 only compresses the second portion 504 of the data blob 304, the data blob 304 may, in certain embodiments, be compressed even if the data blob 304 is deemed to be "hot" and stored on a primary storage tier (since the ability to read the data blob 304 ideally will not be impacted, as explained below).

In certain embodiments, the data reduction module 522 may additionally or alternatively deduplicate data in the data blob 304 to save storage space and reduce the size or amount of data. Similarly, the colors that are selected to encode the data blob 304 may advise the storage virtualization layer 302 to compress the data contained therein, deduplicate the data contained therein, or both, depending on the colors that are used. In certain embodiments, the data reduction techniques that are used depend on the processing power of the storage virtualization layer 302 and the corresponding tradeoff between I/O latency and data reduction. For the purposes of this disclosure, the phrase "data reduction" is used broadly to include data compression, data deduplication, and/or other data reduction techniques.

Optionally, a color removal module 524 may remove any "coloring" from the data blob 304 prior to storage. For example, if SPACE characters in the data blob 304 were replaced with special characters that included color information, these new characters may be returned to the original SPACE characters when the data blob 304 is stored. Conventional data processing may commence from this point forward. In other embodiments, the special characters containing color information may be left alone and stored with the data blob 304. In yet other embodiments, the color removal module 524 may remove "coloring" from a data blob 304 at the time it is read or retrieved, as opposed to when it is stored or written.

Figure 7:
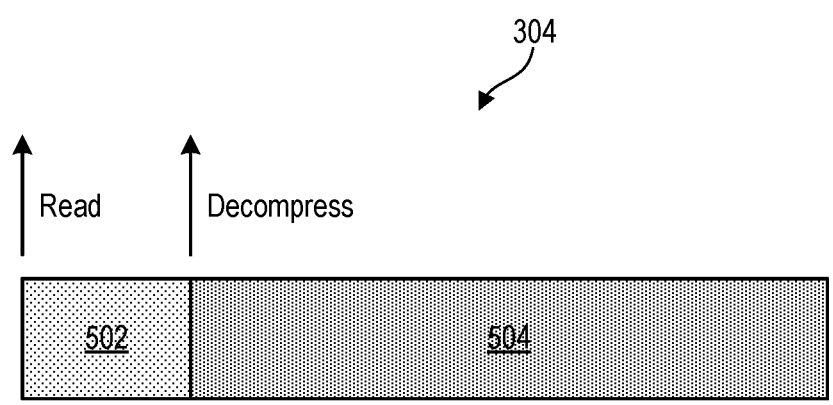
FIG. 7 is a high-level block diagram showing an improved technique for reading unstructured data.

A read module 528 may be used to read a data blob 304 after it has been stored. When the data blob 304 is read, the first portion 502 of the data blob 304 may be read with little if any performance impact while the second portion 504 is decompressed in parallel, as shown in FIG. 7. This will ideally allow the second portion 504 to be decompressed before it needs to be read (i.e., provide a just-in-time or decompress-ahead approach where the second portion 504 is decompressed before it needs to be read). The ratio module 512 may adjust the ratio of the first portion 502 relative to the second portion 504 if the rate of decompression is unable to keep up with the read or retrieval rate.

Figure 6:
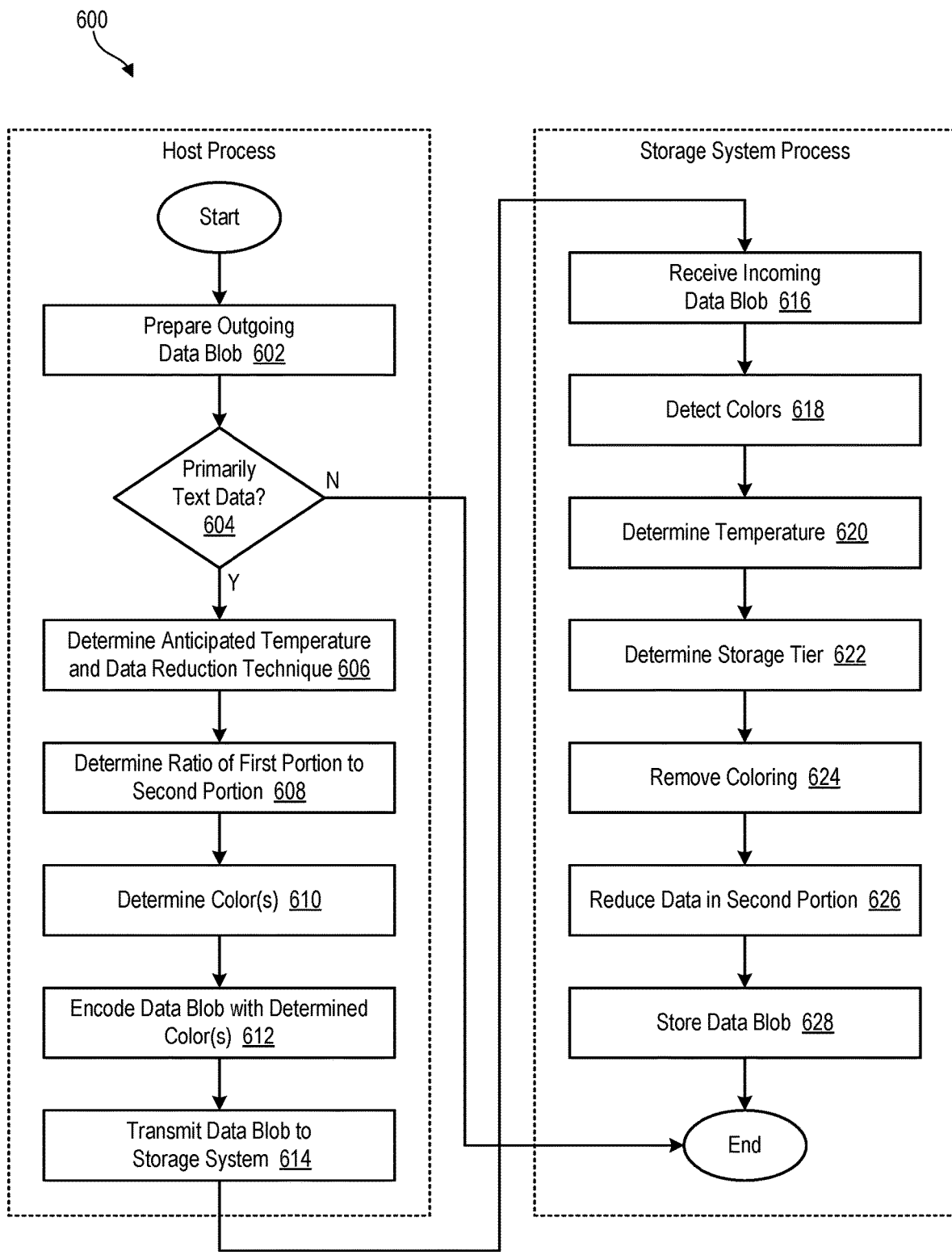
FIG. 6 is a flow diagram showing an improved method for storing unstructured data in a tiered storage system.

Referring to FIG. 6, one embodiment of a method 600 for storing unstructured data in a tiered storage system is illustrated. The method 600 is divided into two different parts, namely a host process and storage system process to indicate where the different method steps are likely to be executed. As shown, the method 600 starts by initially preparing 602 an outgoing data blob 304. The method 600 then determines 604 whether the data blob 304 contains primary text (or compressible) data or if it contains some other type of data (e.g., image data, video data, etc.). If it contains some other type of data, the method 600 ends and the data blob 304 is processed in the conventional manner.

If, however, the data blob 304 contains primarily text data, the method 600 optionally determines 606 the anticipated temperature of the outgoing data blob 304 (i.e., whether the outgoing data blob 304 contains "hot" or "cold" data) and the level of data reduction to be performed on the data blob 304. The method 600 may also determine 608 the ratio of the first portion 502 of the data blob 304 relative to the second portion 504 of the data blob 304 if it has not already been determined or set by default. The method 600 then determines 610 which color(s) will be used to encode the data blob 304 and thereby provide desired information to the storage virtualization layer 302. The method 600 encodes 612 the data blob 304 with these color(s), such as by replacing certain characters in the data with special characters (or potentially adding additional special codes into the text). In certain embodiments, the color(s) convey not only whether the data blob 304 contains textual information and the division between the first portion 502 and second portion 504, but also the temperature of the data. The method 600 then transmits 614 the encoded data blob 304 to the storage system 110 or storage virtualization layer 302.

Upon receiving 616 the encoded data blob 304, the storage system 110 or storage virtualization layer 302 detects the color(s) in the data blob 304, which indicate that the data blob 304 contains compressible information (e.g., text) and the division between the first portion 502 and second portion 504. The method 600 also optionally determines 620 the temperature of the data from the color(s). This information will enable the method 600 to determine 622 the appropriate storage tier on which to store the data blob 304. Once the storage tier is determined, the method 600 optionally removes 624 the coloring in the data blob 304 and reduces 626 the data (e.g, compresses, deduplicates, etc) the second portion 504 while leaving the first portion 502 in its original form. The method 600 then stores 628 the data blob 304 on the storage tier determined at step 622.

The flowcharts and block diagrams in the Figures illustrate the architecture, functionality, and operation of possible implementations of systems, methods, and computer-usable media according to various embodiments of the present invention. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The invention claimed is:

1. A method for selectively compressing unstructured data, the method comprising:
preparing, at a host system, a data binary large object (blob) for storage on a storage system, the data blob comprising unstructured data;
encoding, by the host system, a first portion of the unstructured data with a first color and a second portion of the unstructured data with a second color that is different from the first color, the first color indicating that an associated portion should remain uncompressed and the second color indicating that an associated portion should be compressed, wherein encoding the first portion and the second portion comprises replacing characters within the first portion and the second portion with codes that are indicative of the first color and the second color respectively;
transmitting the encoded data blob to a storage virtualization layer associated with the storage system;
detecting, by the storage virtualization layer, the first color of the first portion and the second color of the second portion;
storing, by the storage virtualization layer, the first portion in an uncompressed format;
compressing, by the storage virtualization layer, the second portion; and
storing, by the storage virtualization layer, the second portion in a compressed format.

2. The method of claim 1, further comprising encoding the first portion with a first color by replacing at least one stock SPACE character in the first portion with a first special character corresponding to the first color.

3. The method of claim 1, further comprising encoding the second portion with a second color by replacing at least one stock SPACE character in the second portion with a second special character corresponding to the second color.

4. The method of claim 1, wherein at least one of the first color and the second color indicate a data reduction technique other than compression to be used by the storage virtualization layer.

5. The method of claim 1, further comprising, upon retrieving the data blob stored on the storage system, retrieving the first portion and decompressing the second portion in parallel.

6. The method of claim 1, wherein at least one of the first color and the second color indicate a level of compression to be used by the storage virtualization layer.

7. The method of claim 1, further comprising using at least one of the first color and second color to convey, to the storage virtualization layer, temperature information associated with the data blob.

8. A computer program product for selectively compressing unstructured data, the computer program product comprising a non-transitory computer-readable medium having computer-usable program code embodied therein, the computer-usable program code comprising:

computer-usable program code to prepare, at a host system, a data binary large object (blob) for storage on a storage system, the data blob comprising unstructured data;
   computer-usable program code to encode, at the host system, a first portion of the unstructured data with a first color and a second portion of the unstructured data with a second color that is different from the first color, the first color indicating that an associated portion should remain uncompressed and the second color indicating that an associated portion should be compressed, wherein encoding the first portion and the second portion comprises replacing characters within the first portion and the second portion with codes that are indicative of the first color and the second color respectively;
   computer-usable program code to transmit the encoded data blob to a storage virtualization layer associated with the storage system;
   computer-usable program code to detect, by the storage virtualization layer, the first color of the first portion and the second color of the second portion;
   computer-usable program code to store, on the storage system, the first portion in an uncompressed format;
   computer-usable program code to compress, by the storage virtualization layer, the second portion; andcomputer-usable program code to store, on the storage system, the second portion in a compressed format.

9. The computer program product of claim 8, further comprising computer-usable program code to encode the first portion with a first color by replacing at least one stock SPACE character in the first portion with a first special character corresponding to the first color.

10. The computer program product of claim 8, further comprising computer-usable program code to encode the second portion with a second color by replacing at least one stock SPACE character in the second portion with a second special character corresponding to the second color.

11. The computer program product of claim 8, wherein at least one of the first color and the second color indicate a data reduction technique other than compression to be used by the storage virtualization layer.

12. The computer program product of claim 8, further comprising computer-usable program code to, upon retrieving the data blob stored on the storage system, retrieve the first portion and decompress the second portion in parallel.

13. The computer program product of claim 8, wherein at least one of the first color and the second color indicate a level of compression to be used by the storage virtualization layer.

14. The computer program product of claim 8, further comprising computer-usable program code to use at least one of the first color and second color to convey, to the storage virtualization layer, temperature information associated with the data blob.

15. A system for selectively compressing unstructured data, the system comprising:
   at least one processor;
   at least one memory device coupled to the at least one processor and storing instructions for execution on the at least one processor, the instructions causing the at least one processor to;
      prepare, at a host system, a data binary large object (blob) for storage on a storage system, the data blob comprising unstructured data;
      encode, at the host system, a first portion of the unstructured data with a first color and a second portion of the unstructured data with a second color that is different from the first color, the first color indicating that an associated portion should remain uncompressed and the second color indicating that an associated portion should be compressed, wherein encoding the first portion and the second portion comprises replacing characters within the first portion and the second portion with codes that are indicative of the first color and the second color respectively;
      transmit the encoded data blob to a storage virtualization layer associated with the storage system;
      detect, by the storage virtualization layer, the first color of the first portion and the second color of the second portion;
      store, on the storage system, the first portion in an uncompressed format;
      compress, by the storage virtualization layer, the second portion; and
      store, on the storage system, the second portion in a compressed format.

16. The system of claim 15, wherein the instructions further cause the at least one processor to encode the first portion with a first color by replacing at least one stock SPACE character in the first portion with a first special character corresponding to the first color, and encode the second portion with a second color by replacing at least one stock SPACE character in the second portion with a second special character corresponding to the second color.

17. The system of claim 15, wherein the instructions further cause the at least one processor to remove the first special character and second special character from the first and second portions.

18. The system of claim 15, wherein the instructions further cause the at least one processor to, upon retrieving the data blob stored on the storage system, retrieve the first portion and decompress the second portion in parallel.

19. The system of claim 15, wherein at least one of the first color and the second color indicate a level of compression to be used by the storage virtualization layer.

20. The system of claim 15, wherein the instructions further cause the at least one processor to use at least one of the first color and second color to convey, to the storage virtualization layer, temperature information associated with the data blob.

* * * * *